(12) United States Patent
Moles et al.

(10) Patent No.: US 6,725,056 B1
(45) Date of Patent: Apr. 20, 2004

(54) SYSTEM AND METHOD FOR SECURE OVER-THE-AIR PROVISIONING OF A MOBILE STATION FROM A PROVISIONING SERVER VIA A TRAFFIC CHANNEL

(75) Inventors: Bryan J. Moles, Dallas, TX (US); Sudhindra P. Herle, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/500,499

(22) Filed: Feb. 9, 2000

(51) Int. Cl.⁷ .................................................. H04B 7/00
(52) U.S. Cl. ...................... 455/524; 455/560; 455/419; 455/411
(58) Field of Search ................................ 455/418, 419, 455/420, 410, 411, 517, 560, 524

(56) References Cited

U.S. PATENT DOCUMENTS

| | | | |
|---|---|---|---|
| 5,841,764 A | * 11/1998 | Roderique et al. | 508/459 |
| 6,144,849 A | * 11/2000 | Nodoushani et al. | 455/419 |
| 6,275,693 B1 | * 8/2001 | Lin et al. | 455/414 |
| 6,453,162 B1 | * 9/2002 | Gentry | 455/433 |
| 6,466,779 B1 | * 10/2002 | Moles et al. | 455/410 |
| 6,587,684 B1 | * 7/2003 | Hsu et al. | 455/419 |

* cited by examiner

*Primary Examiner*—Quochien B. Vuong

(57) ABSTRACT

There is disclosed a provisioning system for use in a wireless network comprising a group of base stations that communicate with mobile stations. The provisioning system provisions unprovisioned mobile stations and prevents unprovisioned mobile stations from accessing an Internet protocol (IP) data network through the wireless network. The provisioning system comprises a provisioning controller that retrieve provisioning data from a provisioning server associated with the IP data network and causes a first base station to transmit the retrieved provisioning data to a first unprovisioned mobile station in a first traffic channel established between the first base station and the first unprovisioned mobile station. The provisioning system prevents any unprovisioned mobile station from accessing the wireless network except by means of a traffic channel, thereby preventing the unprovisioned mobile station from making an unauthorized access to the Internet via a data call to a base station.

21 Claims, 5 Drawing Sheets

SYSTEM AND METHOD FOR SECURE OVER-THE-AIR PROVISIONING OF A MOBILE STATION FROM A PROVISIONING SERVER VIA A TRAFFIC CHANNEL

CROSS-REFERENCE TO RELATED APPLICATIONS

The present invention is related to those disclosed in the following United States patent applications:

1. Ser. No. 09/501,468, filed concurrently herewith, entitled "SYSTEM AND METHOD FOR SECURE PROVISIONING OF A MOBILE STATION FROM A PROVISIONING SERVER USING IWF-BASED IP ADDRESS TRANSLATION;"
2. Ser. No. 09/475,602, filed Dec. 30, 1999, entitled "SYSTEM AND METHOD FOR SECURE PROVISIONING OF A MOBILE STATION FROM A PROVISIONING SERVER USING IP ADDRESS TRANSLATION AT THE BTS/BSC;" and
3. Ser. No. 09/475,766, filed Dec. 30, 1999, entitled "SYSTEM AND METHOD FOR SECURE PROVISIONING OF A MOBILE STATION FROM A PROVISIONING SERVER USING ENCRYPTION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless networks and, more specifically, to a system for performing secure over-the-air (OTA) provisioning of cellular phone handsets and other mobile devices.

BACKGROUND OF THE INVENTION

Reliable predictions indicate that there will be over 300 million cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a subscriber handset (or mobile station) and another party through the wireless network. A smaller number of mobile stations are data devices, such as personal computers (PCs) equipped with cellular/wireless modems. Because the bandwidth for a current generation mobile station is typically limited to a few tens of kilobits per second (Kbps), the applications for the current generation of mobile stations are relatively limited. However, this is expected to change in the next (or third) generation of cellular/wireless technology, sometimes referred to as "3G" wireless/cellular, where a much greater bandwidth will be available to each mobile station (i.e., 125 Kbps or greater). The higher data rates will make Internet applications for mobile stations much more common. For instance, a 3G cell phone (or a PC with a 3G cellular modem) may be used to browse web sites on the Internet, to transmit and receive graphics, to execute streaming audio and/or video applications, and the like. In sum, a much higher percentage of the wireless traffic handled by 3G cellular systems will be Internet protocol (IP) traffic and a lesser percentage will be traditional voice traffic.

In order to make wireless services as convenient and as affordable as possible, wireless service providers frequently sell cellular handsets (or other types of mobile stations) directly to potential subscribers from display booths in supermarkets and department stores. Simple instructions are provided to guide the buyer through the process of activating the cellular handset and signing up for wireless services to become a subscriber. In conventional cellular systems, the handset buyer activates the new handset and signs up for service by dialing "*228xx" on the handset keypad in accordance with the handset instructions. The value of "xx" varies according to the identity of the wireless service provider that sells the handset.

Although initially unprovisioned, the new handset must, of necessity, have certain minimum radio frequency (RF) communication capabilities that enable the handset to become provisioned. Dialing "*228xx" on the handset keypad automatically initiates a special purpose call that connects the handset buyer to an operator. The operator requests certain account information from the buyer, such as personal information, a credit card number, home billing address, and the like. When the account information is collected and the account is set up, the operator instructs the handset buyer to enter several sequences of passwords, code numbers, menu-selected commands, and the like, that enable certain functions in the handset.

This process is frequently referred to as "service provisioning." Service provisioning may activate in the cellular handset a Number Assignment Module (NAM), which gives the handset a unique phone number for incoming calls and provides a roaming capability by identifying approved wireless carriers. Service provisioning may also activate in the handset a Preferred Roaming List (PRL), which is a list of frequencies/bands owned by each carrier in each geographical region and which may identify preferred and/or prohibited frequencies in each region as well. Service provisioning also activates an authentication code, sometimes referred to as an "A-key," in the cellular handset. The handset uses the A-key to authenticate the handset when the subscriber attempts to access the wireless network.

The wireless network uses a home location register (HLR) to store the A-key, the phone number, the roaming capability information, and other data related to each handset that has been or is being authenticated and provisioned by the wireless network. The HLR is a permanent database used by the wireless service provider to identify/verify a subscriber and store individual subscriber data related to features and services. The subscriber's wireless service provider uses the HLR data when the subscriber is accessing the wireless network in the subscriber's home coverage area. Other wireless service providers also use the HLR data (typically accessed via wireline telephone networks) when the subscriber roams outside the subscriber's home coverage area.

The conventional provisioning process described above has numerous drawbacks. A human operator must talk the user through the process of pressing keys and verifying screen results. This is time consuming and frequently results in errors, particularly with unsophisticated subscribers. Mistakes may go unnoticed initially and the subscriber may become frustrated that the cellular service does not operate as advertised. When the mistake is finally diagnosed, the provisioning process may need to be at least partially re-performed. The human operator also adds labor costs to the provisioning process.

It would be preferable to automate cellular service provisioning to the greatest extent possible in order to reduce labor costs, eliminate errors, and make the process more user-friendly by minimizing or eliminating subscriber interaction. In particular, it would be more convenient to perform at least part of the over-the-air (OTA) cellular service provisioning process by accessing a provisioning server from an unprovisioned handset via an Internet connection. The 3G systems will make OTA service provisioning of handsets easier and more common.

However, OTA service provisioning of a handset presents serious security problems for the wireless service provider, particularly with respect to fraud. The base station that handles the initial set-up data call from an unprovisioned handset may not store the required provisioning data. Instead, base stations typically access provisioning data from one or more provisioning servers within the wireless service provider's network and which may or may not be accessible by an intranet or by the Internet. Many wireless service providers operate clusters of base stations that are not directly connected to each other, but rather are connected to the local Bell telephone companies and/or to the major long-distance carriers. Without an Internet or intranet connection, each cluster of base stations would require its own provisioning server. Alternatively, a wireless carrier would have to pay the local Bell companies and/or a long distance company additional line fees to connect the base stations to the provisioning server.

Using an Internet connection allows a wireless service provider to consolidate all service provisioning applications and data in a central repository, rather than maintaining at great expense redundant copies of such information among a large number of provisioning servers. However, it is foreseeable that a sophisticated user could use an unprovisioned handset (possibly with some minor modifications) to access a wireless network under the guise of service provisioning and then use the wireless network to access any IP address on the Internet, not just the IP address of the provisioning server. In effect, the user could defraud the wireless service provider by using the unprovisioned handset to surf the Internet for free.

This problem exists for several reasons. First, IP addresses of other services are freely known to the public. Second, conventional wireless networks do not provide a method or an apparatus capable of blocking access to unauthorized IP addresses that is triggered by the network's knowledge that the mobile is unprovisioned. Third, even if the network provides the mobile with an IP address to be used for provisioning, the mobile must be trusted to use that IP address only.

Therefore, there is a need in the art for improved systems and methods for performing automatic service provisioning of wireless handsets (and other types of mobile stations). In particular, there is a need in the art for systems and methods for performing secure over-the-air provisioning of wireless devices. More particularly, there is a need for systems and methods that are capable of preventing unauthorized persons from using an unprovisioned handset or other type of mobile station to browse the Internet.

SUMMARY OF THE INVENTION

To address the above-discussed deficiencies of the prior art, it is a primary object of the present invention to provide, for use in a wireless network comprising a plurality of base stations, each of the base stations capable of communicating with a plurality of mobile stations, a provisioning system capable of provisioning unprovisioned ones of the plurality of mobile stations and preventing the unprovisioned mobile stations from accessing an Internet protocol (IP) data network through the wireless network. In an advantageous embodiment of the present invention, the provisioning system comprises a provisioning controller capable of retrieving provisioning data from a provisioning server associated with the IP data network and causing a first one of the plurality of base stations to transmit the retrieved provisioning data to a first unprovisioned mobile station in a first traffic channel established between the first base station and the first unprovisioned mobile station.

In one embodiment of the present invention, the provisioning controller is capable of converting the retrieved provisioning data from an IP data packet format to a data burst message format suitable for transmission in the first traffic channel.

In another embodiment of the present invention, the provisioning controller is further capable of receiving user-generated provisioning data from the first unprovisioned mobile station in a data burst message transmitted to the first base station in a second traffic channel established between the first base station and the first unprovisioned mobile station.

In still another embodiment of the present invention, the provisioning controller is capable of converting the received user-generated provisioning data from a data burst message format to an IP data packet format suitable for transmission in the IP data network to the provisioning server.

In yet another embodiment of the present invention, the provisioning controller is capable of determining that the unprovisioned mobile station is unprovisioned and, in response to the determination, is capable of establishing a call connection via a public telecommunications network between the first base station and an operator station capable of initiating a provisioning operation that provisions the unprovisioned mobile station.

In a further embodiment of the present invention, the provisioning controller is capable of receiving from the operator station a provisioning enable signal, where the provisioning enable signal causes the provisioning controller to retrieve the provisioning data from the provisioning server.

In a still further embodiment of the present invention, the provisioning controller determines that the unprovisioned mobile station is unprovisioned according to a unique telephone number dialed by a user of the unprovisioned mobile station.

In a yet further embodiment of the present invention, the provisioning system further comprises an authentication controller coupled to the provisioning controller and capable of authenticating the unprovisioned mobile station in the wireless network, wherein the provisioning controller determines that the unprovisioned mobile station is unprovisioned if the authentication controller sends a signal to the provisioning controller indicating that the unprovisioned mobile station failed to properly authenticate.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
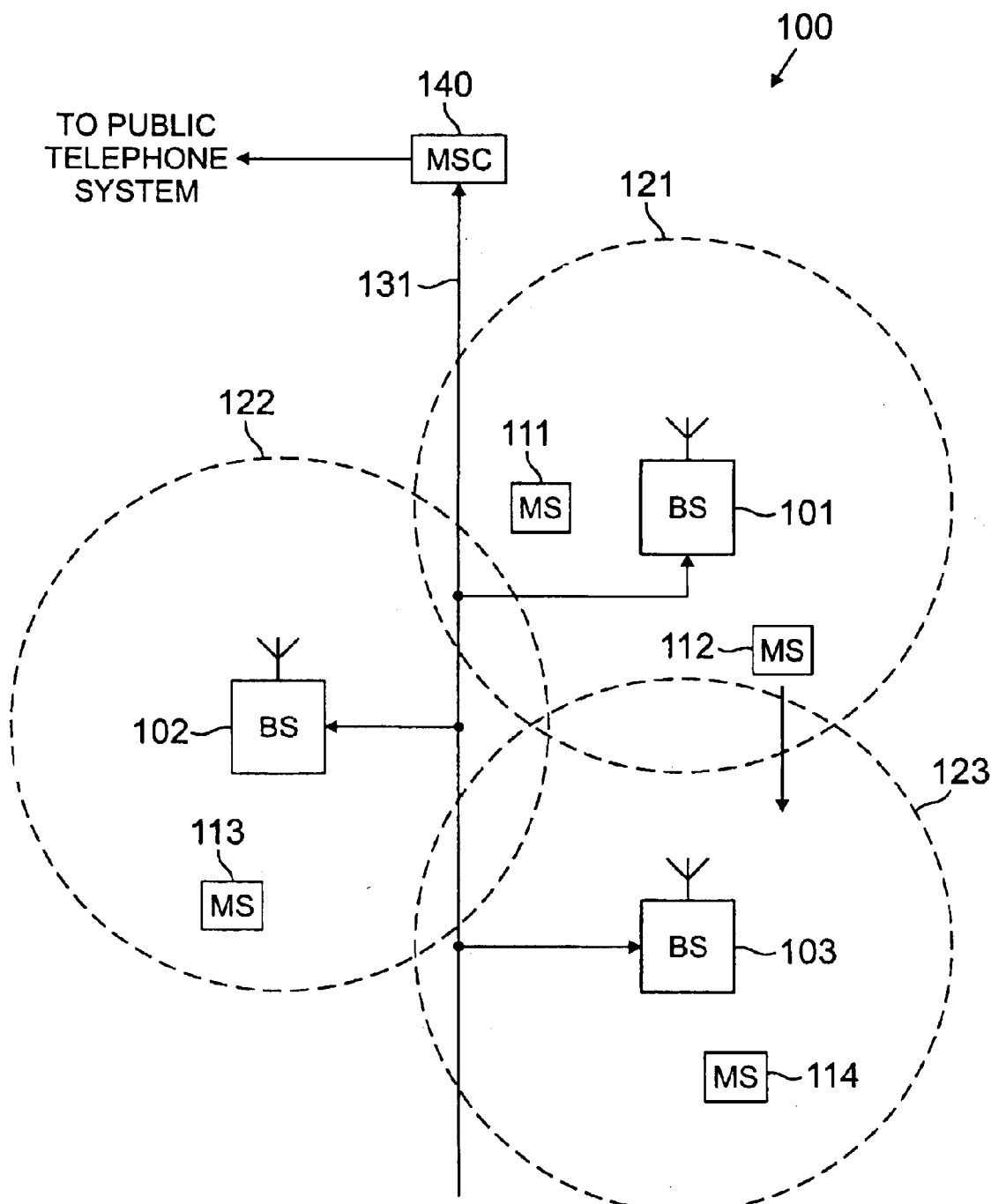
FIG. 1 illustrates a general overview of an exemplary wireless network according to one embodiment of the present invention.

FIG. 1 illustrates a general overview of an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

One or more of mobile stations 111–114 may initially be unprovisioned devices. That is, necessary configuration data, such as Number Assignment Module (NAM) data, Preferred Roaming List (PRL) data, or authentication code (or "A-key") data may not be present in, for example, MS 112 or, if present, may not be properly configured or enabled, so that MS 112 is unable to communicate with BS 101. To enable such unprovisioned devices to operate in wireless network 100, an over-the-air (OTA) service provisioning capability is provided in wireless network 100.

Figure 2:
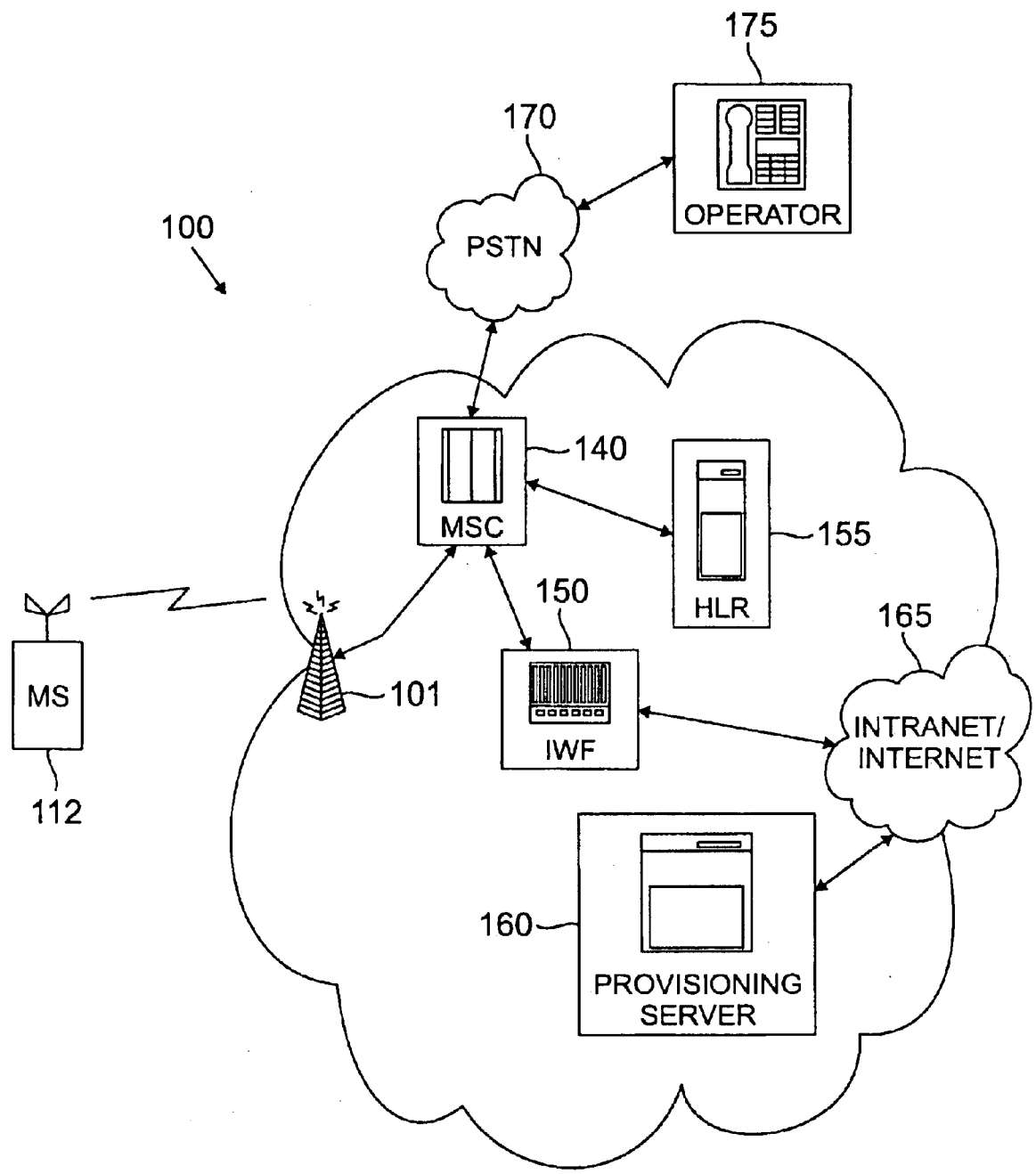
FIG. 2 illustrates an alternate view of selected portions of the exemplary wireless network in FIG. 1 that perform over-the-air (OTA) service provisioning according to one embodiment of the present invention.

FIG. 2 illustrates an alternate view of selected portions of exemplary wireless network 100 that perform over-the-air (OTA) service provisioning according to one embodiment of the present invention. MS 112, BS 101, and MSC 140 are still present, as in FIG. 1. In FIG. 2, wireless network 100 further comprises interworking function (IWF) 150, home location register (HLR) 155, and provisioning server 160. Provisioning server 160 is a system-wide central server that is located remote from the other components of wireless network 100, namely, BS 101, MSC 140, IWF 150, and HLR 155. In order to access data in provisioning server 160, MSC 140 communicates with provisioning server 160 via intranet/Internet 165 (hereafter "Internet 165"). Since data within wireless network 100 may be communicated in one or more of a wide variety of communication protocols, according to the choices made by the wireless service provider, IWF 150 is needed to translate the "native" communication transport protocol that carries application data in wireless network 100 into Internet protocol (IP) based data packets suitable for transmission in Internet 165.

Wireless network 100 allows an unprovisioned handset, such as MS 112, to be provisioned by initiating a voice call (not a data call) through public switched telephone network (PSTN) 170 to operator station 175, which may be either a human operator or an automated voice menu application. The voice call and the provisioning process is initiated when the user of MS 112 dials a predetermined provisioning phone number, such as "*228xx" for example, on the handset keypad in accordance with the handset instructions, where the value of "xx" varies according to the identity of the wireless service provider that sells MS 112. Since MS 112 is unprovisioned and cannot be authenticated, wireless network 100 rejects any dialed number other than "*228xx." Since "*228xx" is used only for provisioning, MS 112 is connected to operator station 175 via BS 101, MSC 140 and PSTN 170.

Once connected to operator station 175, critical information, such as the potential subscriber's credit card information, is gathered from the user of, MS 112 by the human operator or voice menu script. As will be explained below in greater detail, once the critical subscriber information is gathered, operator station 175 sends a provisioning command to the base station communicating with MS 112 (in this case, BS 101) and/or to MSC 140. The critical subscriber information is also sent via MSC 140 to HLR 155 for future use once the provisioning process is complete. The provisioning command causes BS 101 (and/or MSC 140, as the case may be) to establish a session via Internet 165 with provisioning server 160 in order to send the critical subscriber information gathered by operator station 175 to provisioning server 160 and to retrieve necessary provisioning data, such as Number Assignment Module (NAM) data, Preferred Roaming List (PRL) data, or authentication code (i.e., A-Key) data that must be transmitted to MS 112.

As will be explained below in greater detail, the present invention allows the necessary provisioning data to be transmitted to MS 112 by means of a special "data burst" message that occurs in the forward and/or reverse traffic channels that provide communication between MS 112 and BS 101. It is noted that the present invention does not allow MS 112 to access Internet 165 through BS 101 via a data call. MS 112 only communicates with wireless network 100 via conventional traffic channels. BS 101 (and/or MSC 140) acts as an agent for MS 112 and independently establishes and controls the Internet session with provisioning server 160. Thus, BS 101 (and/or MSC 140), according to the principles of the present invention prevents an unprovisioned handset, such as MS 112, from accessing other servers or web sites in Internet 165 by restricting all transactions to provisioning server 160.

It should be noted that the scope of the present invention is not limited to wireless networks that use the Internet to link base stations and provisioning servers. In alternate embodiments of the present invention, Internet 165 may actually be a large intranet having a relatively minimal amount of security that links a group of base stations to one or more provisioning servers. It was also stated above that BS 101 and/or MSC 140 accesses Internet 165 and provides security for wireless network 100. This is because the present invention may be implemented in BS 101 or in MSC 140, or may be distributed between BS 101 and MSC 140. However, for the sake of simplifying the explanation of the principles of the present invention, the description that follows shall assume that the present invention is implemented in BS 101. Those skilled in the art will recognize, however, that the specific implementation described below is illustrative only and that this implementation may be readily adapted and modified so that the present invention may reside virtually anywhere in wireless network 100.

Figure 3:
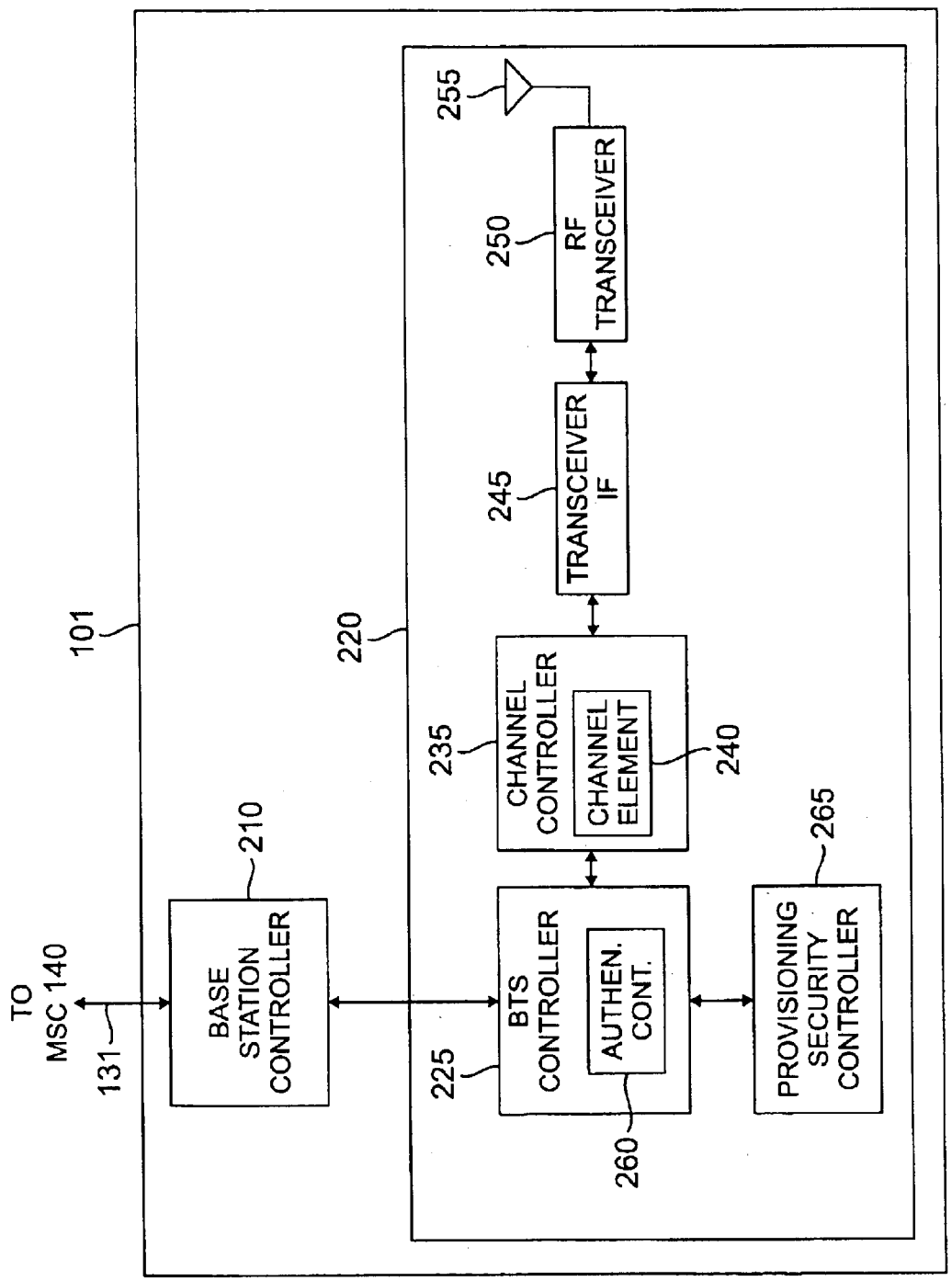
FIG. 3 illustrates in greater detail an exemplary base station in accordance with one embodiment of the present invention.

FIG. 3 illustrates in greater detail exemplary base station 101 in accordance with one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235 with representative channel element 240, transceiver interface (IF) 245, RF transceiver unit 250, antenna array 255, and provisioning security controller 265, described below in greater detail.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 235 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is a multi-sector antenna, such as a three sector antenna in which each antenna sector is responsible for transmitting and receiving in a 120° arc of coverage area.

Additionally, RF transceiver 250 may contain an antenna selection unit to select among different antennas in antenna array 255 during both transmit and receive operations.

BTS controller 225 further comprises authentication controller 260 which verifies whether or not a mobile station, such as MS 112, that is accessing BS 101 has previously been authenticated by wireless network 100 or not. Authentication controller 260, working in conjunction with provisioning security controller 265, also provides the necessary security functions that prevent the use of MS 112 for accessing Internet servers or websites other than provisioning server 160 associated with wireless network 100.

Before any communication can occur between MS 112 and the rest of wireless network 100 through BS 101, authentication controller 260 must first verify (i.e., authenticate) that MS 112 has been service provisioned by determining whether or not MS 112 has, for example, a proper shared secret data (SSD) code and required provisioning data. In a conventional service provisioning process, a subscriber typically enters an A-key into a mobile station during the initial provisioning process. However, other methods may be employed for entering or obtaining the A-key. After the A-key is obtained, the mobile station may automatically generate a shared secret data (SSD) code from the A-key or by another algorithm. In either case, the mobile station transfers its SSD code as part of the authentication process. Once a mobile station is provisioned, each base station in the network will have an SSD code corresponding to the SSD code for the provisioned mobile station.

Mobile communication systems in North America frequently use the Cellular Authentication Verification and Encryption (CAVE) algorithm for authentication purposes. In an advantageous embodiment of the present invention, wireless network 100 utilizes a CAVE algorithm for authentication purposes. MSC 140 begins the authentication process by transferring an authorization (AUTH) bit in an overhead control message over the control channel for cell site 121. When MS 112 recognizes the AUTH bit, MS 112 may automatically transmit identification data on its control channel to BS 101. This MS 112 identification data may include SSD information, electronic serial number (ESN) data, billing information, dialed subscriber number, and other enabling data.

Authentication controller 260 stores initial incoming control channel data from MS 112 and compares the received SSD information with SSD information retrieved from HLR 155. If authentication controller 260 determines that the received SSD information from MS 112 is valid, then authentication controller 260 examines other data stored in HLR 155, such as NAM data and billing information, to determine if MS 112 has been provisioned. If authentication controller 260 verifies that MS 112 is properly provisioned, the voice/data call is transferred to MSC 140 for normal call processing. If authentication controller 260 determines that MS 112 has not been previously provisioned (i.e., no billing information, no NAM data, etc.), authentication controller 260 may automatically transfer the call to operator station 175 via MSC 140 and PSTN 170 in order to begin the provisioning process.

In an alternate embodiment of the present invention, authentication controller 260 may determine that a mobile station accessing BS 101 is unprovisioned by other means. For example, if MS 112 cannot even authenticate itself properly, authentication controller 260 may simply reject the call or may automatically transfer the call to operator station 175 via MSC 140 and PSTN 170 in order to begin the provisioning process. Alternatively, if MS 112 has dialed a special telephone number, such as "*228xx", reserved for service provisioning, authentication controller 260 may also automatically transfer the call to operator station 175 via MSC 140 and PSTN 170 in order to begin the provisioning process.

For the above cases, authentication controller 260 automatically connects MS 112 via forward and reverse traffic channels to operator station 175 through MSC 140. Control over the call is also transferred to provisioning security controller 265. At this point, the human operator or automated voice menu at operator station 175 may instruct the user of MS 112 to begin the provisioning process by orally or manually entering required subscriber data, such as credit card number, address, type of service, and the like. Operator station 175 may transmit the gathered subscriber data to HLR 155 via MSC 140 and to provisioning server 160 via Internet 165.

Figure 4:
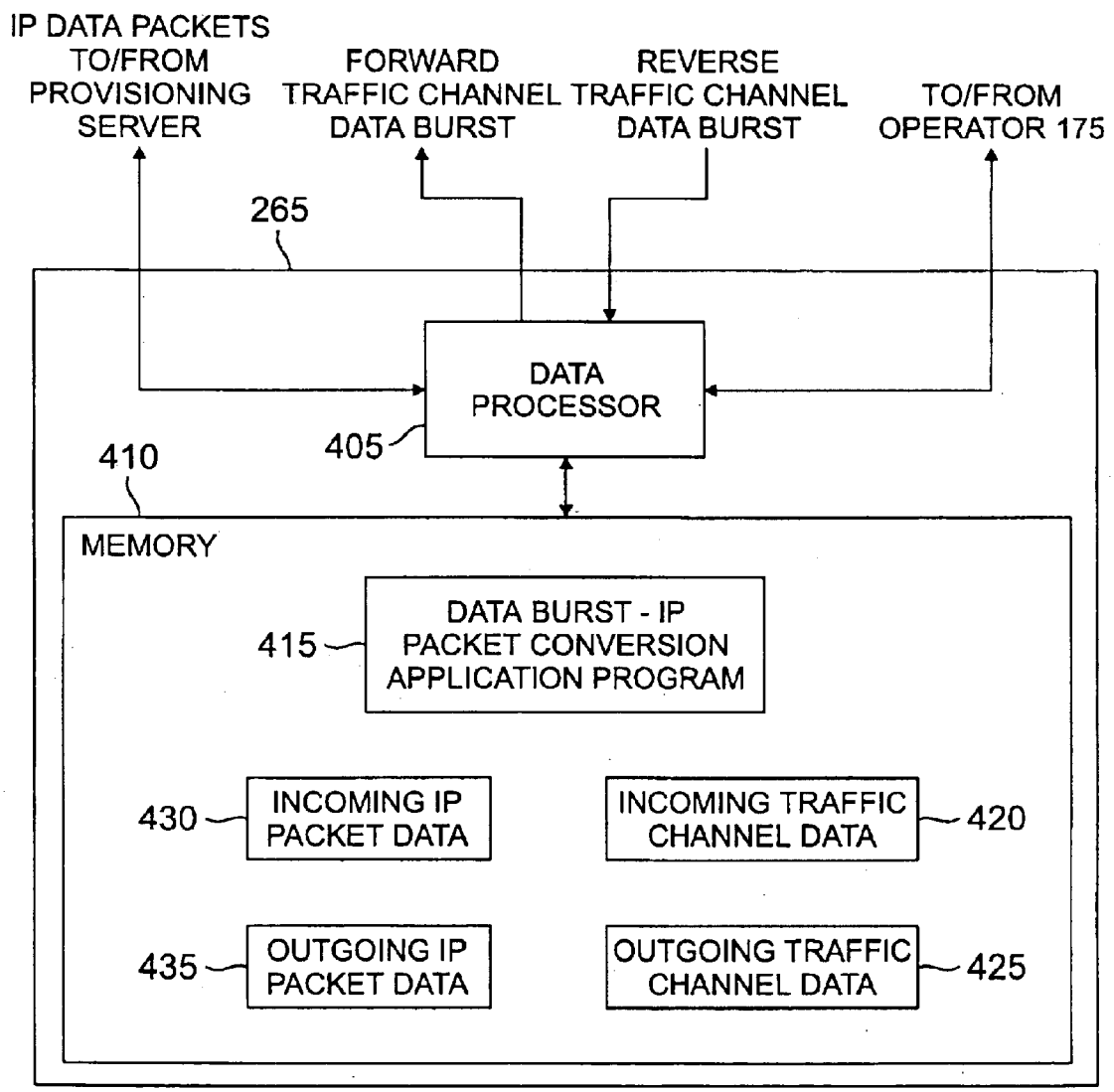
FIG. 4 illustrates in greater detail a provisioning security controller in accordance with one embodiment of the present invention.

FIG. 4 illustrates in greater detail provisioning security controller 265 in accordance with one embodiment of the present invention. Exemplary provisioning security controller 265 comprises data processor 405 and memory 410, which contains storage space for data burst-IP packet conversion application program 415, incoming traffic channel data field 420, outgoing traffic channel data field 425, incoming IP packet data field 430, and outgoing IP packet data field 435.

Any provisioning data that is transmitted between MS 112 and BS 101 as part of the provisioning process is transmitted in "data burst" messages in the forward and reverse traffic channels established between BS 101 and MS 112. The IS-683 protocol establishes techniques for transmitting a block of data in a data burst message in a traffic channel.

BS 101 transfers data burst messages received in a reverse traffic channel from MS 112 to provisioning security controller 265. Data processor 405 in provisioning security controller 265 extracts provisioning information from the reverse channel data burst messages and reformats the extracted provisioning data as IP data packets that are sent to provisioning server 160. The IP address of provisioning server 160 is known to data processor 405 and the rest of wireless network 100 and may be stored in memory 410 or elsewhere in wireless network 100. BS 101 transmits conventional voice signals and keypad entries received in the reverse traffic channel from MS 112 that are not part of a data burst message to operator station 175 via PSTN 170.

Data processor 405 in provisioning security controller 265 also receives provisioning information in IP packets from provisioning server 160 and reformats the IP data packets into data burst messages that are transmitted by BS 101 in a forward traffic channel to MS 112.

Data processor 405 converts provisioning data between IP data packet, format and data burst message format by executing data burst-IP packet conversion application program 415. Memory 410 provides storage for data and programs associated with provisioning security controller 265 and data burst-IP packet conversion application program 415.

Data processor 405 stores provisioning data received in data burst messages in the reverse traffic channel from MS 112 in incoming traffic channel data field 420 prior to conversion to IP data packets. Data processor 405 may receive this provisioning data directly from MS 112. Alternatively, data processor 405 may receive the provisioning data from MS 112 indirectly from operator station 175. After converting the provision data from data burst message format to IP data packet format, data processor 405 stores the converted provisioning data in outgoing IP packet data field 435.

Data processor 405 stores provisioning data received in IP data packets from provisioning server 160 in incoming IP data packet field 430 prior to conversion to data burst message format. After converting the provision data from IP data packet format to data burst message format, data processor 405 stores the converted provisioning data in outgoing traffic channel data field 425. Subsequently, data processor 405 transfers the converted provisioning data in data burst message format to BTS controller 225 for transmission to MS 112 as data burst messages in the reverse traffic channel.

Figure 5:
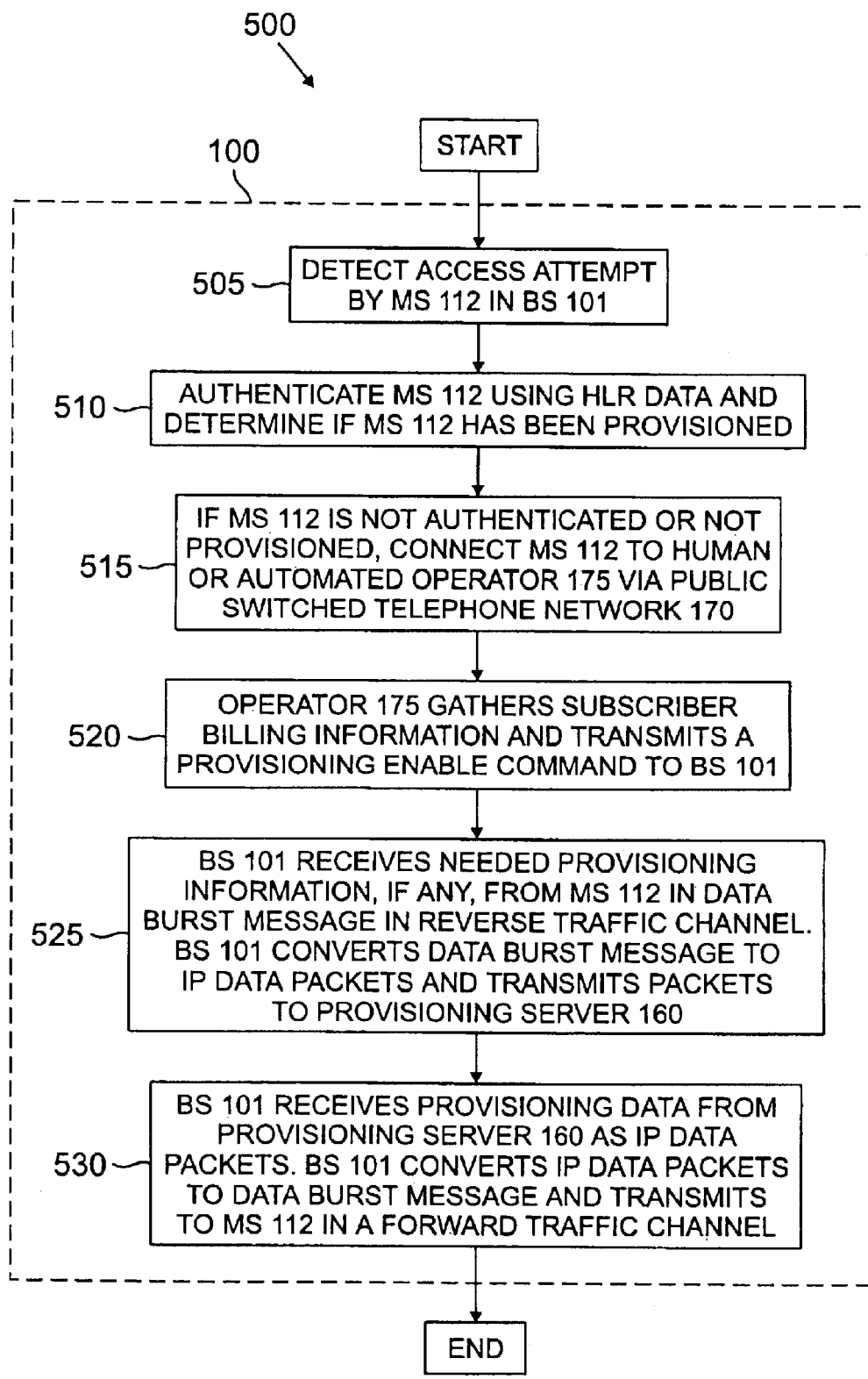
FIG. 5 is a flow chart illustrating an exemplary secure service provisioning operation in the wireless network in FIGS. 1 and 2 in accordance with one embodiment of the present invention.

FIG. 5 depicts flow chart 500, which illustrates an exemplary secure service provisioning operation in wireless network 100 according to one embodiment of the present invention. Initially, BS 101 detects an access attempt by MS 112, such as by determining that MS 112 has responded to an AUTH code transmitted by BS 101 (process step 505). Next, BS 101 receives authentication data from MS 112 and authentication controller 260 uses the received authentication data to access subscriber data associated with MS 112, if any, in HLR 155 in order to determine if MS 112 is provisioned for wireless network 100 (process step 510). BS 101 may determine this provisioning status by one or more methods, including the dialing of a unique provisioning number, SSD information, billing information, and the like.

If MS 112 is already provisioned, BS 101 transmits the received voice and/or data packets to MSC 140 for normal call processing, including Internet call processing (process step 515). If BS 101 is unable to authenticate MS 112 or determines in some other manner that MS 112 has not been provisioned, BS 101 connects MS 112 to operator station 175 via PSTN 170 (process step 515).

Next, operator station 175 gathers required subscriber billing information and transmits a provisioning enable command to BS 101 (process step 520). BS 101 may then receive provisioning set-up data, if any, from MS 112 in reverse traffic channel data burst messages. Provisioning security controller 265 in BS 101 converts the subscriber-supplied provisioning data from operator station 175 and from MS 112 to IP data packets containing the IP address for provisioning server 160 and causes BS 101 to transmit the outgoing IP data packets to provisioning server 160 through Internet 165 (process step 525).

BS 101 receives provisioning data from provisioning server 160 as IP data packets. BS 101 converts IP data packets from provisioning server 160 to data burst message format and transmits the converted provisioning information as data burst messages in the forward traffic channel to MS 112 (process step 530).

BS 101 continues to convert IP packets for transfer between wireless network 100 and Internet 165 until the current call from MS 112 is terminated by the user of MS 112. If the user of MS 112 is a legitimate subscriber attempting to provision MS 112 for the first time, this means that BS 101 continues the transfer process until the service provisioning process is completed and the subscriber using MS 112 ends the call. Once provisioned, MS 112 is ready for normal use.

In alternate embodiments of the present invention, one or both of authentication controller 260 and provisioning security controller 265 may be located outside of BS 101. For example, authentication controller 260 and provisioning security controller 265 may be implemented as a stand alone device coupled directly or indirectly to BS 101. In another embodiment of the present invention, authentication controller 260 and provisioning security controller 265 may be implemented in, for example, MSC 140 or IWF 150. In still another embodiment of the present invention, authentication controller 260 and provisioning security controller 265 may be implemented in only some of the base stations in a wireless network. In such an embodiment, two or more base stations may share the same authentication controller 260 and provisioning security controller 265 disposed in just one of the base stations.

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base stations, each of said base stations capable of communicating with a plurality of mobile stations, a provisioning system capable of provisioning unprovisioned ones of said plurality of mobile stations and preventing said unprovisioned mobile stations from accessing an Internet protocol (IP) data network through said wireless network, said provisioning system comprising:

a provisioning controller capable of retrieving provisioning data from a provisioning server associated with said IP data network and causing a first one of said plurality of base stations to transmit said retrieved provisioning data to a first unprovisioned mobile station in a first traffic channel established between said first base station and said first unprovisioned mobile station, wherein said provisioning controller is capable of determining that said unprovisioned mobile station is requesting provisioning service and, in response to said determination, is capable of establishing a call connection via a public telecommunications network between said first base station and an operator station capable of initiating a provisioning operation that provisions said unprovisioned mobile station.

2. The provisioning system as set forth in claim 1 wherein said provisioning controller is capable of converting said retrieved provisioning data from an IP data packet format to a data burst message format suitable for transmission in said first traffic channel.

3. The provisioning system as set forth in claim 1 wherein said provisioning controller is further capable of receiving user-generated provisioning data from said first unprovisioned mobile station in a data burst message transmitted to said first base station in a second traffic channel established between said first base station and said first unprovisioned mobile station.

4. The provisioning system as set forth in claim 3 wherein said provisioning controller is capable of converting said received user-generated provisioning data from a data burst message format to an IP data packet format suitable for transmission in said IP data network to said provisioning server.

5. The provisioning system as set forth in claim 1 wherein said provisioning controller is capable of receiving from said operator station a provisioning enable signal, where said provisioning enable signal causes said provisioning controller to retrieve said provisioning data from said provisioning server.

6. The provisioning system as set forth in claim 1 wherein said provisioning controller determines that said unprovisioned mobile station is requesting provisioning service according to a unique telephone number dialed by a user of said unprovisioned mobile station.

7. The provisioning system as set forth in claim 1 further comprising an authentication controller coupled to said provisioning controller and capable of authenticating said unprovisioned mobile station in said wireless network, wherein said provisioning controller determines that said unprovisioned mobile station is unprovisioned if said authentication controller sends a signal to said provisioning controller indicating that said unprovisioned mobile station failed to properly authenticate.

8. A wireless network comprising:
a plurality of base stations, each of said base stations capable of communicating with a plurality of mobile stations; and
a provisioning system capable of provisioning unprovisioned ones of said plurality of mobile stations and preventing said unprovisioned mobile stations from accessing an Internet protocol (IP) data network through said wireless network, said provisioning system comprising:
a provisioning controller capable of retrieving provisioning data from a provisioning server associated with said IP data network and causing a first one of said plurality of base stations to transmit said retrieved provisioning data to a first unprovisioned mobile station in a first traffic channel established between said first base station and said first unprovisioned mobile station, wherein said provisioning controller is capable of determining that said unprovisioned mobile station is requesting provisioning service and, in response to said determination, is capable of establishing a call connection via a public telecommunications network between said first base station and an operator station capable of initiating a provisioning operation that provisions said unprovisioned mobile station.

9. The wireless network as set forth in claim 8 wherein said provisioning controller is capable of converting said retrieved provisioning data from an IP data packet format to a data burst message format suitable for transmission in said first traffic channel.

10. The wireless network as set forth in claim 8 wherein said provisioning controller is further capable of receiving user-generated provisioning data from said first unprovisioned mobile station in a data burst message transmitted to said first base station in a second traffic channel established between said first base station and said first unprovisioned mobile station.

11. The wireless network as set forth in claim 10 wherein said provisioning controller is capable of converting said received user-generated provisioning data from a data burst message format to an IP data packet format suitable for transmission in said IP data network to said provisioning server.

12. The wireless network as set forth in claim 8 wherein said provisioning controller is capable of receiving from said operator station a provisioning enable signal, where said provisioning enable signal causes said provisioning controller to retrieve said provisioning data from said provisioning server.

13. The wireless network as set forth in claim 8 wherein said provisioning controller determines that said unprovisioned mobile station is requesting provisioning service according to a unique telephone number dialed by a user of said unprovisioned mobile station.

14. The wireless network as set forth in claim 8 wherein said provisioning system further comprises an authentication controller coupled to said provisioning controller and capable of authenticating said unprovisioned mobile station in said wireless network, wherein said provisioning controller determines that said unprovisioned mobile station is unprovisioned if said authentication controller sends a signal to said provisioning controller indicating that said unprovisioned mobile station failed to properly authenticate.

15. For use in a wireless network comprising a plurality of base stations, each of the base stations capable of communicating with a plurality of mobile stations, a method of provisioning unprovisioned ones of the plurality of mobile stations and preventing the unprovisioned mobile stations from accessing an Internet protocol (IP) data network through the wireless network, the method comprising the steps of:
retrieving provisioning data from a provisioning server associated with the IP data network;
causing a first one of the plurality of base stations to transmit the retrieved provisioning data to a first unprovisioned mobile station in a first traffic channel established between the first base station and the first unprovisioned mobile station;
determining whether the unprovisioned mobile station is requesting provisioning service; and
in response to a determination that the unprovisioned mobile station is requesting provisioning service, establishing a call connection via a public telecommunications network between the first base station and an operator station capable of initiating a provisioning operation that provisions the unprovisioned mobile station.

16. The method as set forth in claim 15 including the further step of converting the retrieved provisioning data from an IP data packet format to a data burst message format suitable for transmission in the first traffic channel.

17. The method as set forth in claim 15 including the further step of receiving user-generated provisioning data from the first unprovisioned mobile station in a data burst message transmitted to the first base station in a second traffic channel established between the first base station and the first unprovisioned mobile station.

18. The method as set forth in claim 17 including the further step of converting the received user-generated provisioning data from a data burst message format to an IP data packet format suitable for transmission in the IP data network to the provisioning server.

19. The method as set forth in claim 15 including the further step of receiving from the operator station a provisioning enable signal, wherein receipt of the provisioning enable signal causes the step of retrieving the provisioning data from the provisioning server associated with the IP data network.

20. The method as set forth in claim 15 wherein the step of determining whether the unprovisioned mobile station is requesting provisioning service comprises the step of determining whether a user of the unprovisioned mobile station dialed a unique telephone number.

21. The method as set forth in claim 15 including the further step of authenticating the unprovisioned mobile station in the wireless network, and wherein the step of determining whether the unprovisioned mobile station is requesting provisioning service comprises the step of determining that the unprovisioned mobile station failed to properly authenticate.

* * * * *